United States Patent [19]

Shia et al.

[11] Patent Number: 5,181,779
[45] Date of Patent: Jan. 26, 1993

[54] THERMOCOUPLE TEMPERATURE SENSOR AND A METHOD OF MEASURING THE TEMPERATURE OF MOLTEN IRON

[75] Inventors: Yoshiaki Shia; Hideaki Mori, both of Tokai; Otojiro Kida, Yokohama; Hiroshi Taketsugu, Takasago, all of Japan

[73] Assignees: Nippon Steel Corporation; Asahi Glass Co., Ltd., both of Tokyo, Japan

[21] Appl. No.: 730,849

[22] PCT Filed: Nov. 22, 1989

[86] PCT No.: PCT/JP89/01189
§ 371 Date: Jul. 22, 1991
§ 102(e) Date: Jul. 22, 1991

[87] PCT Pub. No.: WO91/07643
PCT Pub. Date: May 30, 1991

[51] Int. Cl.$^5$ .............................................. G01K 1/08
[52] U.S. Cl. ................................... 374/139; 374/179; 374/208; 136/232
[58] Field of Search ............... 374/139, 140, 163, 179, 374/208; 136/230, 232, 233, 234

[56] References Cited

U.S. PATENT DOCUMENTS

| 3,647,558 | 3/1972 | McMurtry | 136/234 |
|---|---|---|---|
| 3,791,209 | 2/1974 | Norburn | 374/140 |
| 4,018,624 | 4/1977 | Rizzolo | 136/232 X |
| 4,216,028 | 8/1980 | Kurita | 136/234 |
| 4,238,957 | 12/1980 | Bailey et al. | 136/232 X |
| 4,290,306 | 9/1981 | Murakami et al. | 374/140 |
| 4,358,630 | 11/1982 | Falk | 374/139 X |
| 4,396,792 | 8/1983 | Falk | 374/139 X |
| 4,721,534 | 1/1988 | Phillippi et al. | 374/179 X |
| 4,863,283 | 9/1989 | Falk | 374/179 X |

FOREIGN PATENT DOCUMENTS

| 51-136186 | 11/1976 | Japan . |
|---|---|---|
| 53-047883 | 4/1978 | Japan . |
| 55-38290 | 3/1980 | Japan . |
| 57-101730 | 6/1982 | Japan . |
| 246636 | 11/1986 | Japan . |
| 62-189629 | 12/1987 | Japan . |
| 63-128225 | 5/1988 | Japan . |
| 63-128226 | 5/1988 | Japan . |
| 63-187018 | 11/1988 | Japan . |
| 1-288738 | 11/1989 | Japan . |
| 1-288739 | 11/1989 | Japan . |
| 1-288740 | 11/1989 | Japan . |
| 1-288741 | 11/1989 | Japan . |

Primary Examiner—William A. Cuchlinski, Jr.
Assistant Examiner—G. Bradley Bennett
Attorney, Agent, or Firm—Kenyon & Kenyon

[57] ABSTRACT

A thermocouple temperature sensor employs a protecting tube made of metal-boride-based ceramics, and a platinum-rhodium-based thermocouple. To prevent a deterioration of the thermocouple due to a reducing gas generated in the protecting when used at a high service temperature, the thermocouple is placed in an insulation tube, which is placed inside the protecting tube. In addition, a front end portion of the insulation tube is covered with a noble-metal cap mainly composed of platinum group metal, to prevent the reducing gas generated in the protecting tube from reaching a connection point of the thermocouple. The top end of the protecting tube is open, and a terminal box with a ventilation means to smoothly discharge the reducing gas in provided. This arrangement remarkably prolongs the service life of the thermocouple, and thus it is able to continuously measure the temperature of molten pig iron and molten steel for a long interval.

12 Claims, 5 Drawing Sheets

THERMOCOUPLE TEMPERATURE SENSOR AND A METHOD OF MEASURING THE TEMPERATURE OF MOLTEN IRON

TECHNICAL FIELD

The invention relates to a thermocouple temperature sensor for continuously measuring the temperature of molten metal, etc., and a method of measuring the temperature of molten iron such as molten pig iron and molten steel with the sensor.

BACKGROUND ART

As the instruments to measure the temperature of hot molten metal such as molten pig iron and molten steel, radiation thermometers, optical pyrometers, thermocouple thermometers and etc. are used, and among them, the thermocouple thermometers are most preferable in terms of accuracy. Most commonly used thermocouple thermometers for measuring the temperature of molten pig iron and molten steel are consumable thermometers having a heat sensing portion that comprises a platinum-rhodium-based thermocouple (hereinafter referred to as the PR thermocouple) and a quartz glass tube to protect the tip of the thermocouple. When this thermometer is immersed in molten pig iron or molten steel, the heat sensing portion consumes and spoiled in a very short time (10 to 20 seconds) so that the temperature measurement must be finished in a short time. In addition, the heat sensing portion must be replaced for each measurement. Namely, this kind of thermometer cannot continuously measure a temperature for a long interval, and it is expensive to measure temperatures frequently. Moreover, the characteristics of each thermocouples differs from one another, and it is difficult to maintain the accuracy of temperature measurement. Therefore, there is a strong demand for a thermometer that can measure the temperature of molten metal continuously for a long interval. An immersing type thermocouple thermometer with a protecting tube is disclosed in, for example, Japanese Unexamined Utility Model Publication No. 38290/1980. This discloses to use an outer and an inner protecting tubes. Where the outer protecting tube, which contacts with a molten metal, is made of boron nitride ceramics and the inner protecting tube is made of alumina ceramics. Another known protecting tube is made of a composite material of molybdenum and zirconia.

A thermocouple thermometer employing such a protecting tube can be used to measure the temperature of molten pig iron or molten steel continuously for five to ten hours, but the service life of the protective tube is still insufficient. Recently, several materials having preferable characteristics for the protecting tube have become available. These materials have a good corrosion resistance against molten metal such as molten pig iron and molten steel and against molten slag, as well as a sufficient strength, heat resistance and heat conductivity. They are metal-boride-based ceramics such as $ZrB_2$, $TiB_2$ and $TaB_2$. In particular, $ZrB_2$ has the most preferable characteristics.

A thermometer employing a protecting tube made of metal-boride-based ceramics is disclosed in Japanese Unexamined Utility Model Publication No. 189629/1987.

The metal-boride-based ceramics is a non-oxide material, and a protecting tube made thereof, therefore, is oxidized by a surrounding oxidising atmosphere when used at a high temperature, to generate a reducing gas inside the protecting tube. On the other hand, when the PR thermocouple is used as a temperature measuring sensor, it will be deteriorated by the reducing gas due to sublimation, recrystallization and alloying. When a combination of the protecting tube and the PR thermocouple is used to measure the PR temperature of molten metal such as molten pig iron and molten steel, the PR thermocouple quickly deteriorates to abruptly change an electromotive force or else the wires break. As the result, the temperature sensor cannot continue to measure the temperature in a short time, compared with the service life of protecting tube determined by the corrosion rate.

An object of the present invention is to protect the PR thermocouple to be deteriorated by the reducing gas to be generated in the protecting tube made of metal-boride-based ceramics when it is used at a high service temperature, and to provide a thermocouple temperature sensor that can continuously measure the temperature of molten metal such as molten steel and molten pig iron for a long interval, and a method of measuring the temperature of molten iron with the thermocouple temperature sensor.

DISCLOSURE OF THE INVENTION

To achieve the above objects, the present invention provides a thermocouple temperature sensor comprising a protecting tube made of metal-boride-based ceramics, a platinum-rhodium-based thermocouple disposed inside the protecting tube, and an insulation tube made of oxide for accommodating first and second metal wires of the thermocouple. The temperature sensor is characterized in that a noble-metal cap mainly composed of platinum group metal covers the connection point of the thermocouple positioned at a front end part of the insulation tube.

The noble-metal cap isolates the connection point of the thermocouple from a reducing gas drifting inside the protecting tube, thereby preventing a deterioration of the thermocouple due to the reducing gas. It is understood that a vapor of platinum sublimated from the noble-metal cap may prevent the damage of the thermocouple due to the sublimation of the platinum-rhodium-based thermocouple.

According to a preferred aspect of the thermocouple temperature sensor of the present invention, the top end of the protective tube is open toward an outside system.

According to another preferred aspect of the thermocouple temperature sensor of the present invention, the insulation tube is made of alumina-based ceramics, and has two through holes. The total length of the insulation tube is substantially the same as or longer than the total length of the protecting tube.

According to still another preferred aspect of the thermocouple temperature sensor of the present invention, the metal-boride-based ceramics protecting tube is made of zirconium boride ceramics, and an inner protecting tube mainly composed of alumina is disposed between the protecting tube and the insulation tube. The zirconium boride ceramics may be composed of 70 to 95 wt% of $ZrB_2$, 1 to 15 wt% of SiC, and 4 to 29 wt% of BN, and may have such characteristics as a bulk specific gravity of 3.0 to 6.0, a bending strength of 10 kg/mm² or more, a coefficient of thermal expansion of about $6 \times 10^{-6}$ /° C., and a thermal shock resistance ($\Delta T$) of 250° C. to 1000° C. The alumina produces little reducing gas at a high service temperature and prevents the reducing gas generated in the protecting tube from reaching the insulation tube, thereby preventing a deterioration of the thermocouple.

The insulation tube may be made of ceramics having as main components zirconia and magnesia. In this case, it is preferable to use the inner protecting tube with ceramics mainly composed of magnesia.

According to still another preferred aspect of the thermocouple temperature sensor of the present invention, the top end of the protective tube is open toward the outside system, and a ventilating means is provided thereon for forcibly discharging the gas from the protecting tube.

The open top end of the protecting tube toward the outside system promotes the convection of the reducing gas generated when the protecting tube is heated to a high service temperature. The reducing gas convects upward in the protecting tube and is discharged, and fresh air enters into the protecting tube from the outside system, thereby preventing the deterioration of the thermocouple due to the reducing gas. The ventilating means provided on the top end of the protecting tube forcibly discharges the gas from the protecting tube, to further improve the ventilation effect, and prevents the deterioration of the thermocouple.

A method of measuring the temperature of molten iron according to the present invention employs the above-mentioned thermocouple temperature sensor to measure the temperature of molten pig iron or molten steel. This method can continuously and precisely measure the temperature of molten metal for a long interval such as several tens of hours without replacing the temperature sensor.

BEST MODE OF CARRYING OUT THE INVENTION

The embodiments of the thermocouple temperature sensor according to the present invention will be explained with reference to the drawings.

Figure 1:
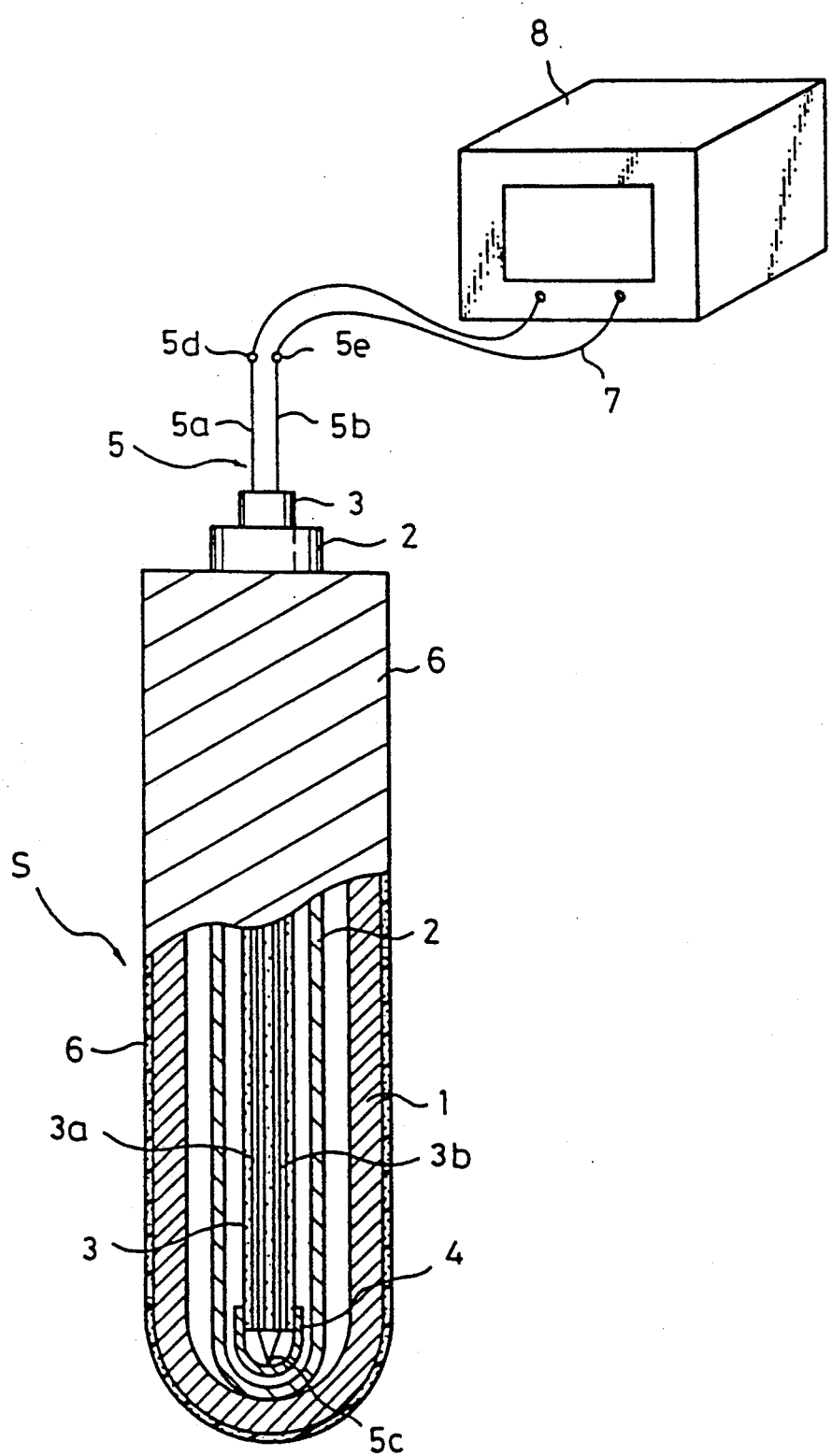
FIG. 1 is a partly sectioned side view schematically showing a thermocouple temperature sensor according to an embodiment of the present invention.

FIG. 1 is a partly sectioned side view schematically showing an embodiments of the thermocouple temperature sensor according to the present invention.

In FIG. 1, the thermocouple temperature sensor S comprises a protecting tube 1 made of ceramics having as a main component zirconium boride ($ZrB_2$) (hereinafter referred to as zirconium boride ceramics); an inner protecting tube 2 disposed inside the protecting tube 1 and made of ceramics having as a main component alumina (hereinafter referred to as alumina ceramics); and an insulation tube 3 disposed inside the inner protecting tube 2 and made of the alumina ceramics. The zirconium boride ceramics of the protecting tube 1 is composed of 85 wt% of $ZrB_2$, 10 wt% of BN, and 5 wt% of SiC. The protecting tube 1 has an outer diameter of 25 mm, an inner diameter of 15 mm, and a length of 850 mm. The alumina ceramics of the inner protecting tube 2 and insulation tube 3 contains 96 wt% of $Al_2O_3$ or more. The length of each of the tubes 2 and 3 is substantially equal to the length of the protecting tube 1. The outer side of the protecting tube 1 is spirally wound with a silica-based glass fiber tape 6. The glass fiber tape 6 melts when the thermocouple temperature sensor S of the embodiment is immersed in molten metal whose temperature is to be measured. The molten glass fiber tape forms a glass coating over the protecting tube 1, to thereby prevent the oxidation of the protecting tube 1 and temper a severe heat shock to be subjected to the protecting tube 1 when the thermocouple temperature sensor S of the embodiment is immersed in the molten metal. The embodiment simply winds the silica-based glass fiber tape in a spiral shape around the protecting tube 1 so that it is simple to prepare the thermocouple temperature sensor. In addition, the glass layer may be easily formed around the thermocouple temperature sensor.

The coating 6 is not necessarily made of glass fiber but can be made of any material which can temper the severe heat shock to be subjected to the protecting tube 1 when the temperature sensor is immersed in molten metal. For example, a refractory powder and glass powder are mixed together with water to be a slurry, which is applied over the surface of the protecting tube and properly heated or sintered. Alternatively, ceramics fibers are formed into a cylindrical shape matching with the external shape of the protecting tube 1, and fitted over the protecting tube 1 before use. This may provide the same effect as the glass fiber 6; damping the heat shock.

The insulation tube 3 has insertion holes 3a and 3b for passing metal wires 5a and 5b of the platinum-rhodium-based thermocouple 5. The first and the second metal wires 5a and 5b of the thermocouple 5-are inserted into the insertion holes 3a and 3b, respectively. A connection point 5c of the metal wires 5a and 5b is located at a front open portion of the insulation tube 3. The connection point 5c is made by welding in an inert gas. The front opening of the insulation tube 3 is completely covered with a noble-metal cap 4 mainly composed of platinum group metal. This cap prevents the connection point 5c of the thermocouple 5 from directly coming into contact with the reducing gas penetrating into the inner protecting tube 2.

The cap 4 may be made of not only platinum but also noble metals such as rhodium and iridium or their alloys.

One of the metal wires 5a and 5b of the thermocouple 5 serves as a plus electrode wire, and the other as a minus electrode wire. The plus electrode wire may be made of an alloy of 70% of platinum and 30% of rhodium, and the minus electrode wire an alloy of 94% of platinum and 6% of rhodium. This composition improves the durability at a high service temperature. As the metal wires 5a and 5b, the plus electrode wire may be made of an alloy of 87% of platinum and 13% of rhodium, and the minus electrode wire of pure platinum.

The other ends of the metal wires 5a and 5b of the thermocouple 5 are connected to output terminals 5d and 5e. The output terminals 5d and 5e are connected to a temperature recorder 8 or etc., through compensation leads 7, to complete a temperature measuring apparatus.

To measure the temperature of molten metal such as molten pig iron, a front end portion of the thermocouple temperature sensor S is immersed in the molten metal to generate a electro motive force at the output terminals 5d and 5e in response to the temperature of the front end portion of the sensor.

When the front end portion of the thermocouple temperature sensor S is immersed in the molten metal such as molten steel having a temperature as high as one thousand and a several hundreds degrees centigrade, the zirconium-boride-based ceramics having a high melting point of 3060° C. is gradually oxidized to generate a reducing gas in the protecting tube 1. According to the thermocouple temperature sensor S of the first embodiment of the present invention, however, the inner protecting tube 2 prevents the reducing gas from entering further inside. When the thermocouple temperature sensor S is kept at a high service temperature for a long interval, however, the reducing gas generated from the protecting tube 1 gradually penetrates the inner protecting tube 2 and reaches the insulation tube 3. Then, the noble-metal cap 4 and insulation tube 3 of the first embodiment prevent the reducing gas from coming into contact with the connection point 5c of the thermocouple. This arrangement dramatically extends the service life of the thermocouple 5 of the thermocouple temperature sensor of the invention.

According to the thermocouple temperature sensor S of the embodiment, the inner protecting tube 2, noble-metal cap 4, and insulation tube 3 check the penetration of the reducing gas, to thereby extend the service life of the thermocouple 5. In addition, the protecting tube 1 made of, for example, the zirconium boride (ZrB$_2$) ceramics, has per se an extended service life. Accordingly, the thermocouple temperature sensor S can be kept immersed in molten metal such as molten steel for a long interval, to continuously measure the temperature of the molten metal.

The thermocouple temperature sensor of the embodiment in FIG. 1 was prepared to form a continuous temperature measuring apparatus. With this apparatus, the temperature ranging from 1520° C. to 1580° C. of molten steel contained in a tundish for continuous casting facilities was measured. Without any interruption due to a deterioration of the thermocouple, the apparatus was able to accurately measure the temperature for about 70 hours. The same apparatus was also able to accurately measure the temperature ranging from 1400° C. to 1550° C. of molten pig iron for about 85 hours. The measurements were interrupted when the zirconium boride ceramics protecting tube was corroded with the molten steel or molten pig iron.

To test the effect of the embodiment, the upper end of the protecting tube 1 was opened, and the noble-metal cap was removed. With this arrangement, the temperature of molten steel was measured under the same situation. The thermocouple was broken and unable to measure the temperature after about five hours. While, the upper end of the protective tube 1 was closed, and a platinum cap was attached to the tip of the insulation tube. With this arrangement, the temperature of molten steel was measured under the same situation. The thermocouple was broken and unable to measure the temperature after about 40 hours.

A ceramics protecting tube 1 mainly composed of boron nitride was employed with the same arrangement of FIG. 1 to measure the temperature of molten steel under the same situation. The protecting tube 1 was consumed after about 10 hours and became unable to measure the temperature. Next, a composite protecting tube 1 made of metal molybdenum and zirconia was employed to measure the temperature of molten steel under the same condition. The protecting tube 1 was consumed after about five hours and became unable to measure the temperature.

A protecting tube 1 made of zirconium boride ceramics having an open top end was employed, and a platinum cap was attached to the tip of the insulation tube. (the inner protective tube 2, however, was removed.) With this arrangement, the temperature of molten steel was measured under the same situation. The thermocouple was broken after about 10 hours and became unable to continue the measurement.

In this way, the embodiment extends the service life of the platinum-rhodium-based thermocouple more than the service life of the protecting tube of boride-based ceramics.

The embodiment of the invention shown in FIG. 2 will be explained.

Figure 2:
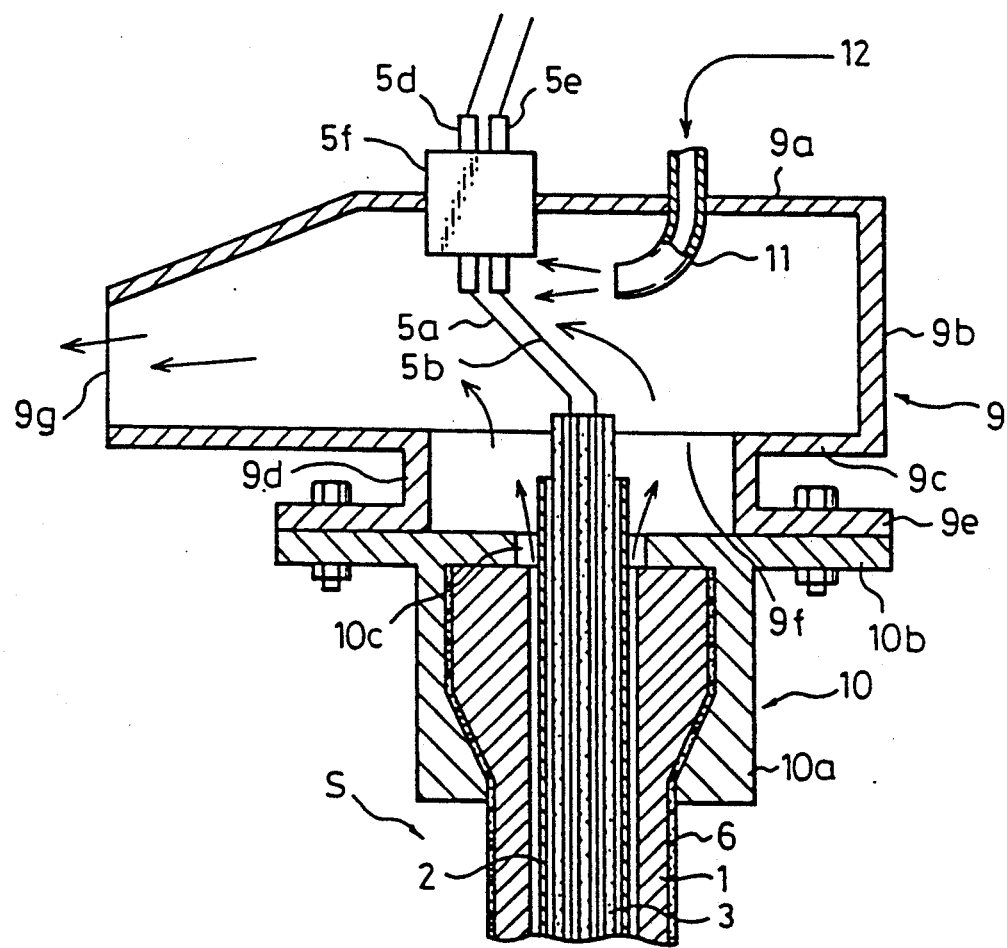
FIG. 2 is a sectional view showing an upper part of a thermocouple temperature sensor according to an another embodiment of the present invention.

FIG. 2 is a sectional view of an upper part of a thermocouple temperature sensor showing an another embodiment of the present invention. The embodiment provides the top end of the protecting tube 1 of the embodiment of FIG. 1 with a means for ventilating the reducing gas generated from the protecting tube 1. Namely, the top end of the zirconium boride ceramics protecting tube 1 is provided with a holder 10 having a flange 10a to which a terminal box 9 having an opening 9g for discharging the reducing gas is removably attached. The terminal box 9 has a upper wall 9a to which a connection terminal 5f is fitted. The output terminals 5d and 5e, connected to the metal wires 5a and 5b of the PR thermocouple 5, are fixed to the connection terminal 5f. The terminal box 9 also has an air guide tube 11 for introducing air 12 for cooling the connection terminal 5f. A side wall 9b of the terminal box 9 has a height to separate the connection terminal 5f away from the top of the protecting tube 1 by a predetermined distance. An opening 9g of the terminal box 9 is open on the downstream side of the airflow 12. A bottom plate 9c of the terminal box 9 is integral with a flange 9e through a cylindrical portion 9d having an opening 9f.

The holder 10 comprises a cylindrical portion 10a fixed to the upper end of the protecting tube 1, and a flange 10b having a center opening 10c through which the inner protecting tube 2 extends.

With this arrangement of the embodiment, the air guide tube 11 introduces the air 12, which is blown toward the connection terminal 5f in the terminal box 9. The air cools the connection terminal 5f, passes through the opening 9g, and goes outside the terminal box 9. Since the inside of the terminal box 9 is always ventilated to have fresh air, the reducing gas generated in the protecting tube 1 is effectively discharged outside through the holder opening 10c and cylindrical portion 9d of terminal box.

To test the effect of this embodiment, the air guide tube was blocked so that air could not be introduced, and the temperature ranging from 1520° C. to 1580° C. of molten steel contained in a tundish for continuous casting facilities was measured. The thermocouple was broken after about 50 hours, and the measurement could not be continued.

On the other hand, according to the embodiment, when air was introduced at a rate of 0.05 m²/min into the terminal box 9 during the measurement, without any troubles, the temperature could be accurately measured under the same situation for about 65 hours.

The embodiment of FIG. 3 will be explained.

Figure 3:
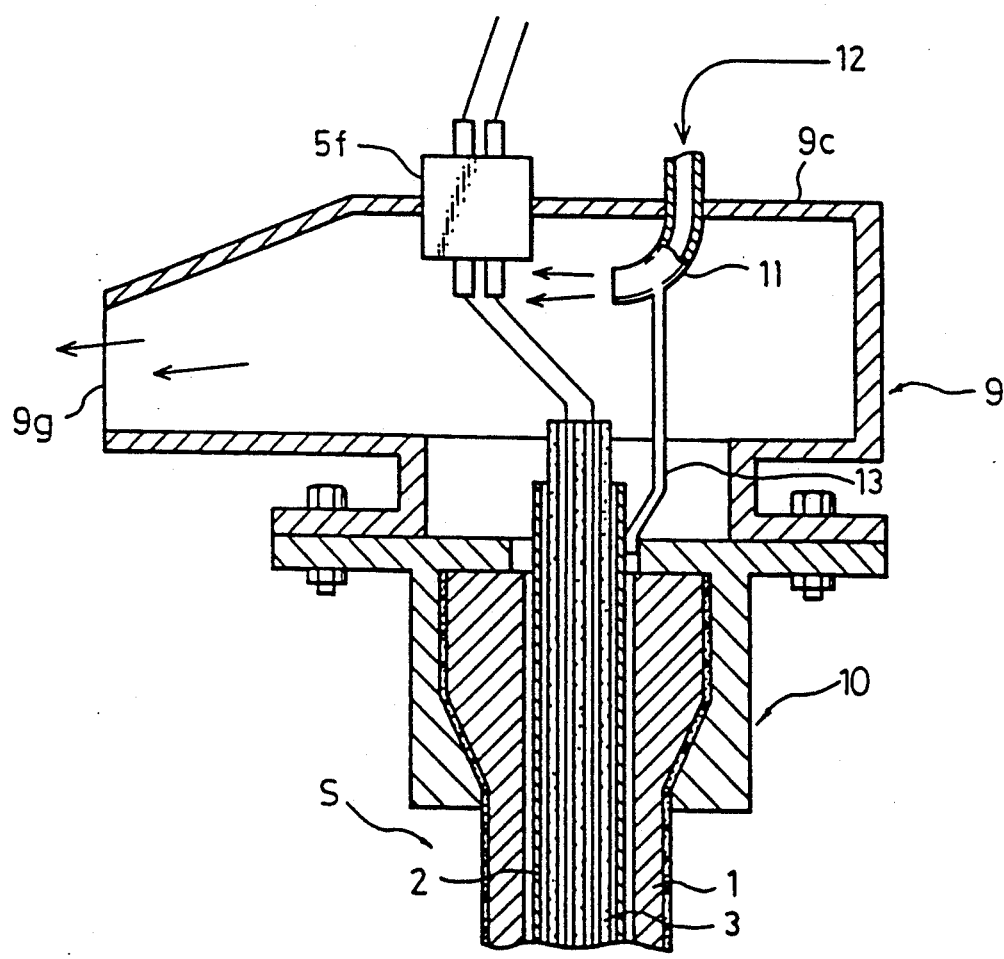
FIG. 3 is a sectional view showing an upper part of a thermocouple temperature sensor according to still another embodiment of the present invention.

FIG. 3 is a sectional view of an upper part of a thermocouple temperature sensor showing an another embodiment of the present invention. The embodiment provides the air guide tube 11 of the embodiment of FIG. 2 with a bypass tube 13. An open end of the bypass tube 13 is oriented toward a gap between an inner circumferential face of the protecting tube 1 and an outer circumferential face of the inner protecting tube 2. A cross-sectional area of the bypass tube 13 is designed such that, when air passes through the air guide tube 11, the bypass tube 13 draws a gas from the opening of the protecting tube 1. This arrangement positively draws and effectively ventilates the reducing gas generated in the protecting tube 1.

A thermocouple temperature sensor of this arrangement was employed to measure the temperature ranging from 1520° C. to 1580° C. of molten steel. The sensor could continuously and accurately measure the temperature for 20 about 75 hours.

Next, the embodiment of FIG. 4 will be explained.

Figure 4:
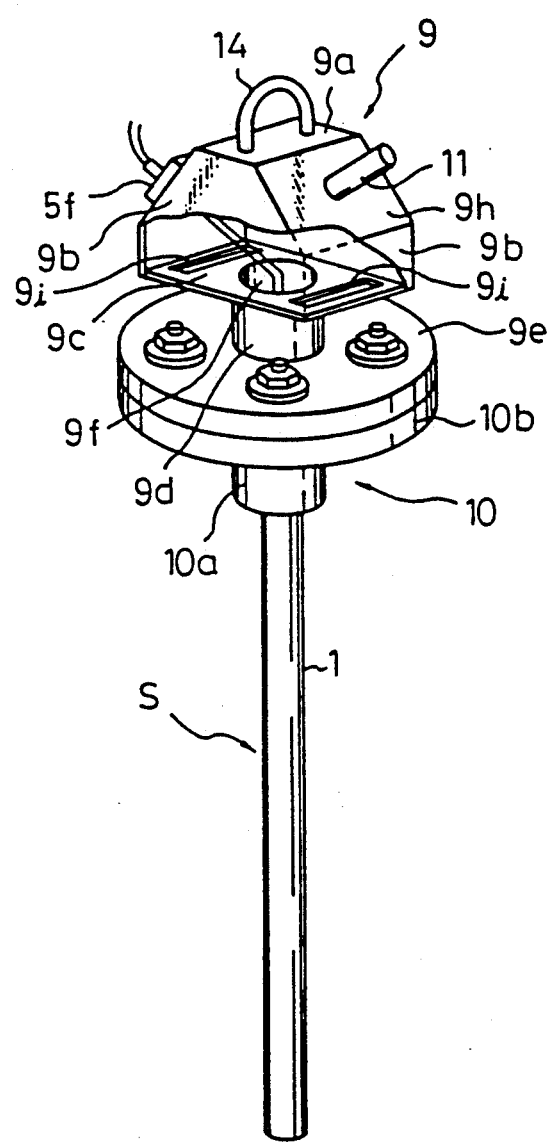
FIG. 4 is a partly broken perspective view showing a thermocouple temperature sensor according to still another embodiment of the present invention.
Figure 5:
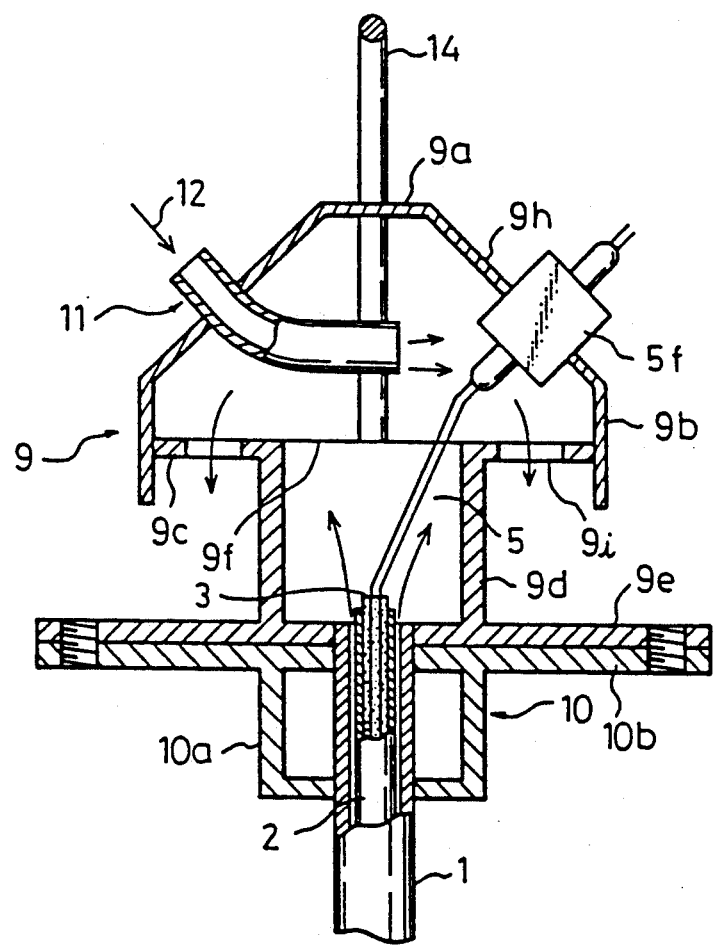
FIG. 5 is a sectional view showing an upper part of the embodiment of FIG. 4.

FIG. 4 is a partly broken perspective view of a thermocouple temperature sensor schematically showing an another embodiment of the present invention. This has an improvement with the terminal box 9. The details of an upper part of the terminal box are shown in the sectional view of FIG. 5. In this FIGURE, the terminal box 9 comprises a handle 14, a upper wall 9a, side walls 9b, sloped portions 9h to which an air guide tube 11 and a connection terminal 5f are fixed, a cylindrical portion 9d, a flange 9e, and a bottom plate 9c which is integral with the cylindrical portion 9d and flange 9e. This embodiment is characterized in that the bottom plate 9c has two degassing openings 9i, which (one of the two in the FIGURE) are formed under the connection terminal 5f.

Since the degassing openings 9i are formed on the bottom plate 9c of the terminal box 9 according to this embodiment, dust does not enter the terminal box 9 through the openings 9i even if the temperature sensor is used in a dusty environment. This enables the thermocouple temperature sensor to be used for an even longer interval. In addition, the air blown toward the connection terminal 5f flows smoothly to efficiently discharge the reducing gas produced in the protecting tube 1.

CAPABILITY OF EXPLOITATION IN INDUSTRY

As explained above, a temperature sensor according to the present invention employs a protecting tube made of boride-based ceramics and a platinum-rhodium-based thermocouple, additionally, the present invention can prevent a deterioration of the thermocouple due to a reducing gas generated when the protecting tube is oxidized. With sufficient use of the corrosion resistance capability of protecting tube made of the metal-boride-based ceramics, said protective tube is combined with the platinum-rhodium-based thermocouple, the present invention makes it possible to continuously measure the temperature of molten metal such as molten pig iron and molten steel for a long interval.

The thermocouple temperature sensor of the present invention eliminates a frequent replacing work of thermometers in, for example, a steel manufacturing process. Since the temperature sensor of the present invention makes it possible to continuously measure the temperature of molten metal more accurately and stably than conventional thermometers, and also enables to precisely control the temperature of molten pig iron or molten steel. In this way, the invention contributes to not only a saving of labor and natural resources but also improves the quality of steel products, and therefore, has a great capability of exploitation in the industry.

I claim:

1. A thermocouple temperature sensor comprising a platinum-rhodium-based thermocouple having first and second metal wires, a connection point of the wires forming a heat sensing portion; an oxide insulation tube accommodating the metal wires, the heat sensing portion of the thermocouple being exposed from a front end portion of the insulation tube; a noble-metal cap mainly composed of platinum group metal completely covering the front end portion of the insulation tube to thereby cover said heat sensing portion of the thermocouple; and a protecting tube made of metal-boride based ceramics accommodating the insulation tube and noble-metal cap.

2. A thermocouple temperature sensor as set forth in claim 1, wherein an upper end portion of the protecting tube is open toward an outside system to which an interior of the protecting tube is open.

3. A thermocouple temperature sensor as set forth in claim 1, wherein the insulation tube is made of ceramics mainly composed of alumina and is provided with insertion holes for passing the couple of metal wires respectively, the total length of the insulation tube being substantially equal to or longer than the total length of the protecting tube.

4. A thermocouple temperature sensor as set forth in claim 1, further comprising an inner protecting tube mainly composed of alumina and disposed between the protecting tube and the insulation tube.

5. A thermocouple temperature sensor as set forth in claim 1, wherein the protecting tube is made of ceramics mainly composed of zirconium boride ($ZrB_2$).

6. A thermocouple temperature sensor as set forth in claim 1, further comprising a connection terminal for fixing output terminals to which the metal wires of the thermocouple are connected; a terminal box to which the connection terminal is fixed, the terminal box being fixed to the top end of the protecting tube and having an opening being open an inside thereof toward the outside system; and a ventilating means is fitted to the terminal box.

7. A thermocouple temperature sensor as set forth in claim 6, wherein the ventilating means includes an air guide tube for introducing air into the terminal box.

8. A thermocouple temperature sensor as set forth in claim 6 or 7, wherein the ventilating means exhausts a gas drifting around the open end of the protecting tube.

9. A thermocouple temperature sensor as set forth in claim 6, wherein a side wall of the terminal box has an opening.

10. A thermocouple temperature sensor as set forth in claim 6, wherein a bottom plate of the terminal box has an opening.

11. A thermocouple temperature sensor as set forth in claim 1 or 6, wherein an outer circumferential face of the protecting tube is covered with glass fibers.

12. A method of measuring the temperature of molten iron by immersing a front end portion of a thermocouple temperature sensor into the molten iron, the thermocouple temperature sensor involving a platinum-rhodium-based thermocouple having first and second metal wires, a connection point of the metal wires forming a heat sensing portion, an oxide insulation tube accommodating the metal wires, the heat sensing portion of the thermocouple being exposed from a front end portion of the insulation tube, a noble-metal cap mainly composed of platinum group metal completely covering the front end portion of the insulation tube to thereby cover the heat sensing portion of the thermocouple, an inner protecting tube mainly composed of platinum group metal completely covering the front end portion of the insulation tube to thereby cover the heat sensing portion of the thermocouple, an inner protecting tube mainly composed of alumina accommodating the insulation tube and the noble-metal cap, and a protecting tube made of metal-boride-based ceramics accommodating the inner protecting tube.

* * * * *

UNITED STATES PATENT AND TRADEMARK OFFICE
CERTIFICATE OF CORRECTION

PATENT NO. : 5,181,779

DATED : January 26, 1993

INVENTOR(S) : Yoshiaki SHIA, et al.

It is certified that error appears in the above-identified patent and that said Letters Patent is hereby corrected as shown below:

Title page, item [57]
ABSTRACT, line 14, change "in" to --is--.

Column 1, line 27, change "spoiled" to --spoils--.

Column 1, line 43, change "tubes" to --tube.--

Column 2, line 16, change "to be" to --from being--.

Column 2, line 17, delete "to be".

Column 2, line 47, change "aspect" to --embodiment--.

Column 3, line 58, change "embodiments" to --embodiment--.

Column 4, line 16, change "to be subjected to the protecting tube 1" to --to which the protecting tube 1 is subjecting--.

Column 4, line 27, change "to be subjected to the protecting tube 1: to --to which the protecting tube 1 is subjected--.

UNITED STATES PATENT AND TRADEMARK OFFICE
CERTIFICATE OF CORRECTION

PATENT NO. : 5,181,779
DATED : January 26, 1993
INVENTOR(S) : Yoshiaki SHIA, et al.

It is certified that error appears in the above-identified patent and that said Letters Patent is hereby corrected as shown below:

Column 4, line 41, delete the hyphen between "5" and "are".

Column 5, line 6, change "a" to --an--.

Column 5, line 60, change "While" to --Next--.

Column 6, line 25, delete "another".

Column 7, line 8, delete "an" before "another".

Column 7, line 17, delete "a".

Column 7, line 29, delete "another".

Column 7, line 33, change "a upper" to --an upper--.

Column 7, line 55, change "thermocouple, additionally," to --thermocouple. Additionally,--.

Column 7, line 61, before "said" insert --and with-- and change "is" to --being--.

Column 7, line 65, change "interval." to --period of time--.

UNITED STATES PATENT AND TRADEMARK OFFICE
CERTIFICATE OF CORRECTION

PATENT NO. : 5,181,779
DATED : January 26, 1963
INVENTOR(S) : Yoshiaki SHIA, et al.

It is certified that error appears in the above-identified patent and that said Letters Patent is hereby corrected as shown below:

Column 8, lines 4 and 5, change "and also enables to precisely control" to --it also allows precise control--.

Column 8, line 31, change "couple of" to --two--.

Column 8, line 48, between "open" and "an" insert --to--.

Column 10, lines 2-4 delete completely.

Column 10, line 5, delete "tecting tube mainly composed of".

Signed and Sealed this

Twenty-first Day of December, 1993

BRUCE LEHMAN

*Attest:*

*Attesting Officer*     *Commissioner of Patents and Trademarks*